Dec. 1, 1970  J. R. McCONNELL  3,543,374
DRILLING AND BOLTING OF STRUCTURAL MEMBERS
Filed June 17, 1968  2 Sheets-Sheet 1

INVENTOR.
John R. McConnell

Dec. 1, 1970   J. R. McCONNELL   3,543,374
DRILLING AND BOLTING OF STRUCTURAL MEMBERS
Filed June 17, 1968   2 Sheets-Sheet 2
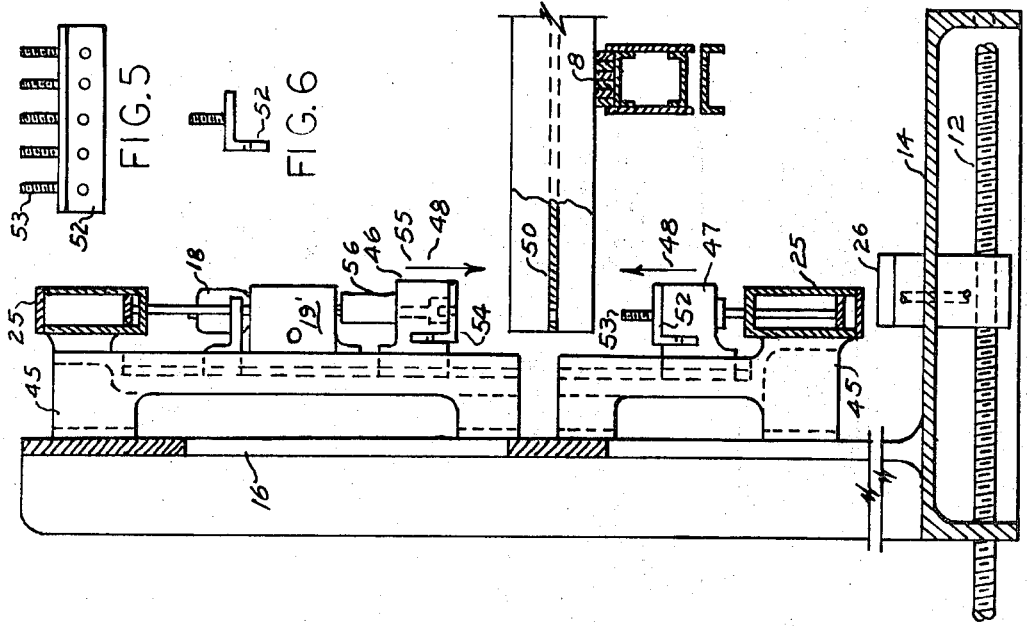
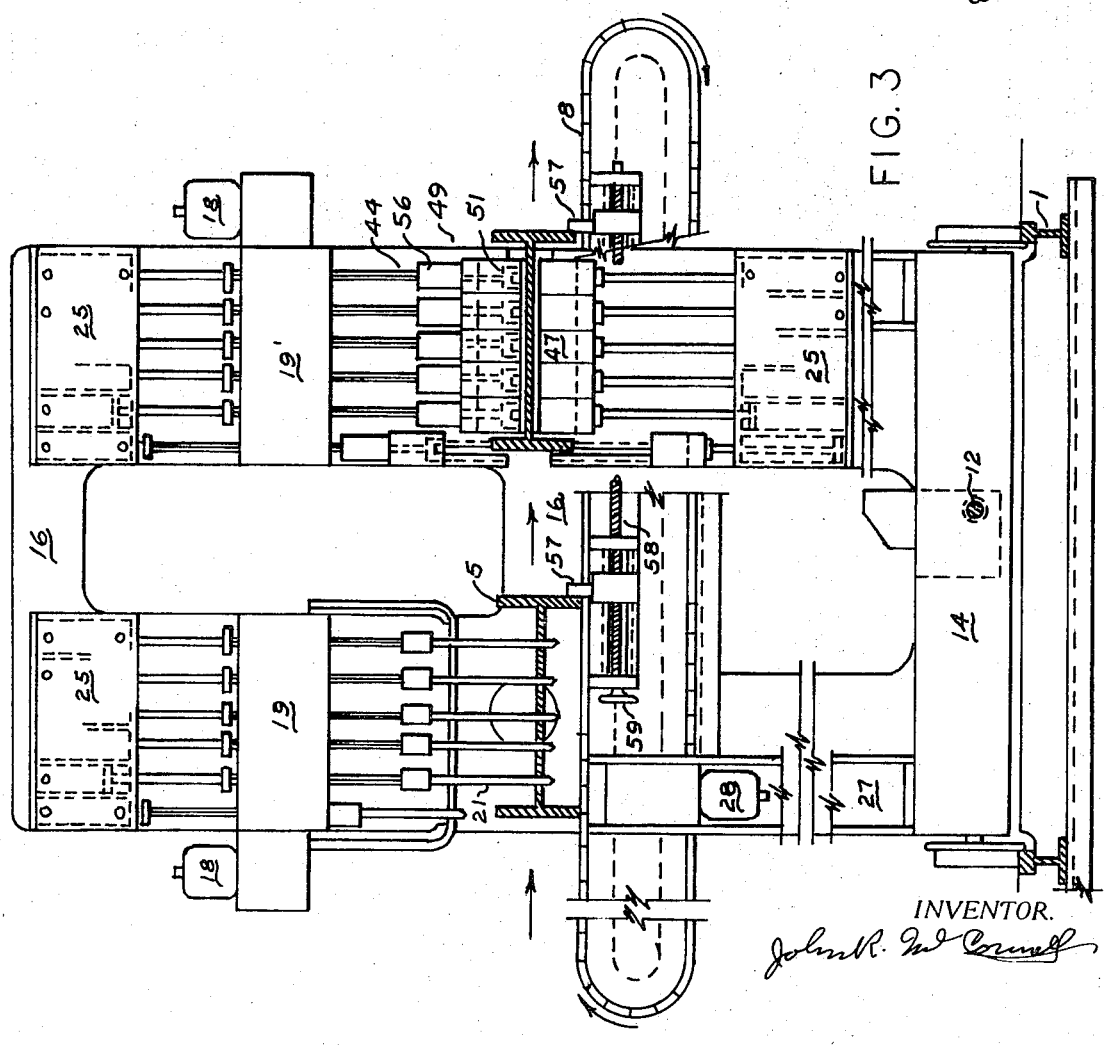
INVENTOR.
John R. McConnell United States Patent Office 3,543,374
Patented Dec. 1, 1970

3,543,374
DRILLING AND BOLTING OF STRUCTURAL
MEMBERS
John R. McConnell, 148 Woodside Ave.,
Ridgewood, N.J. 07450
Filed June 17, 1968, Ser. No. 737,786
Int. Cl. B23p *19/04, 17/00, 19/00*
U.S. Cl. 29—200                    1 Claim

ABSTRACT OF THE DISCLOSURE

The main shop crane moves a batch of raw shapes into place parallel to the combined fabricating machines. A light hoist, transversely operable on a short minor runway beam attached to the roof construction, successively hoists individual shapes and deposits them on the dual conveyor belts that are integral with the dual opposite-hand end located fabricators. Forward actuation of the belts moves the shapes to adjustable combined stops, to locate the shapes precisely under the operating centres of the dual-paired, vertical action, drilling and bolt-torquing units. The said torquing elements also apply the required pre-assembled mated connection angles to opposite sides of the shape-web, apply the nuts and torque them to a pre-selected tensional value, at each end of the shape. The lower connection angles have plural bolt shanks or bolts rigidly attached to them, preferably by welding. The mobile track-mounted units are symmetrically pre-located by a common oppositely threaded shaft to suit the overall length of the fabricated beam, after which length-centering of the random length shape is executed previous to the drilling and bolting. This apparatus, shown in FIG. 3, is advantageous in the finished fabrication of long runs of identical beams.

This invention relates to combined machines for the hoisting conveying, and the improved drilling, assembling and bolting of structural beams.

It is an object of the present invention to set forth a compact facile integrated apparatus for the fast and economic mechanized fabrication of the finished members in a single continuing co-ordinated handling throughout in the shop.

One objective is to provide an integrated co-acting apparatus that will take raw shapes from an adjacent batch and convey them transversely through the fabricating apparatus, thereby processing them into completely finished building members, and deposit them in a forward area.

Another objective is to provide an apparatus that is quickly adjustable, without any changes of the equipment, to process unit members of various lengths, depths and weights, producing completed members of precise overall working lengths from raw shapes of shorter random lengths.

Figure 2:
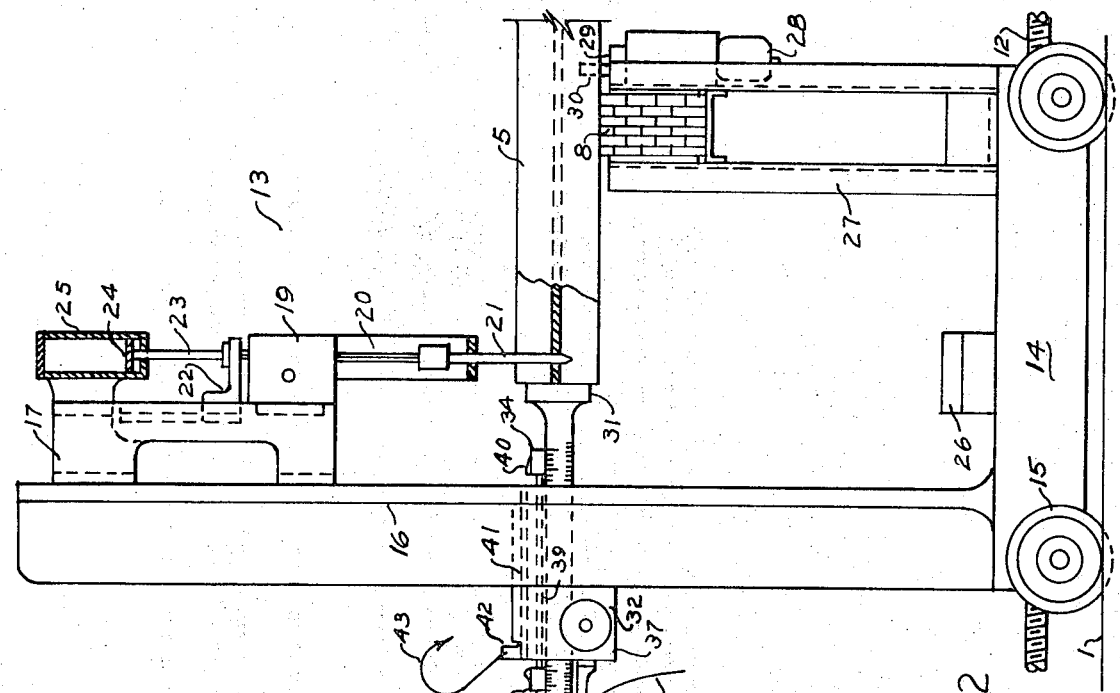
Figure 1:
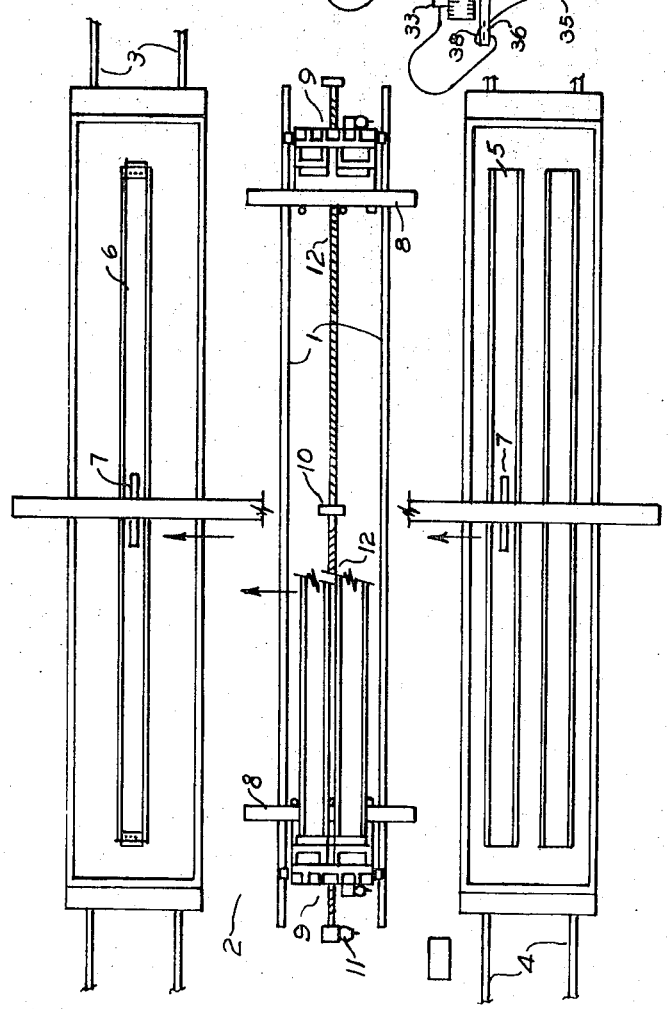

For other objects and a better understanding of the invention, reference may be had to the following detailed description taken in conjunction with the accompanying drawing in which:

FIG. 1 is a plan layout of the co-ordinated apparatus.
FIG. 2 is a side view of the drilling mechanism.
FIG. 3 is an end view of the combined drilling and bolting unit.
FIG. 4 is a side view, partly in section, of the bolting mechanism.
FIG. 5 is a front view of the lower connection angle with attached bolt shanks.
FIG. 6 is an end view taken on FIG. 5.
FIG. 1 shows a plan-layout of the track-aligned 1 fabricating apparatus 2 flanked by two parallel two-rail tracks 3 and 4 holding respectively raw shapes 5 and finished members 6. A powered-hoist and trolley 7 move the shapes and members transversely onto and off the conveyor belts 8, integrally mounted above the inner toes of the dual facing combined drilling-bolting units 9. The dual fabricating units 9 are pre-located as required from the central anchorage 10 by the powered 11 oppositely threaded shaft 12, to produce members 6 of the necessary overall working length.

FIG. 2 shows a side view of the shape drilling mechanism 13 that is on the left-hand side of FIG. 3. A base 14 wheel 15 mounted on the track 1 supports a rear wall 16 from which a bracket 17 suspends a powered 18 multiple drill box 19, from which the spindles 20 and drills 21 are projected by a guide 22, moved by a non-rotating piston rod 23 and piston 24 actuated by a fluid pressured cylinder 25. A dial box 26, geared to base re-locating shaft 12 indicates the distance from the central anchorage to the operating centres of the drills. The post 27 supported conveyor belt 8, carrying one end of the shape, is driven by the motor 28. With the shape positioned transversely by the solenoid 29 projected stop 30, the length-centering rams 31 projecting through the rear walls of the dual opposed fabricating units 9 of FIG. 1 are projected against opposite ends of the shape, until the resistance of the shape actuates an overload switch that reverses the current to the matched-power motors 32 to withdraw the rams.

Due to problems of the steel rolling mills, trade practice permits a one-half inch tolerance plus or minus in the ordered length of shapes. Fabricating shops order the shapes one inch short of full length to avoid having to re-cut some of them shorter in the shop. Therefore, the random-length shapes are one-half to one and one-half inches short, with the connection angles overhanging the shape at each end one-quarter to three-quarters of an inch. Because of this, it is important to length-centre the shape to avoid bolts, located too close to one end of the shape, tearing out of the holes under stress.

To automatically check this allowable variation, gage blocks 33 and 34 are secured to the upper side of the square-shank ram 31. One leg of a low voltage circuit 35 is run to a switch 36 on the side of the gear box 37. When the ram is retracted it depresses a sprung button 38 that opens the switch 36 breaking the continuity of this leg. With the ram projected, a wire from switch 36 continues the leg to gage block 33, from which a light copper rod 39 threaded into the blocks extends this leg of the circuit to gage block 34. The gage blocks are spaced on the rams to indicate visually the allowable variation permitted in the length of the shape. With the shape length centered, if block 33 extends into the gear box 37 or block 34 extends into back wall 16 it indicates the shape is too short or too long for a satisfactory member. In this case a conducting spring 40 on one of the gage blocks completes a circuit through an insulated bus bar 41, terminal 42 and a power source located in leg 43 to ring a bell or light a light to signify rejection of the shape before it is fabricated. Visual checking of the location of gage blocks can be depended on for checking length as an alternative.

If the shape is satisfactory, it is drilled and forwarded to the bolting mechanism.

FIG. 3 shows the combined fabricating unit 9 with the bolting mechanism 44 on the right side. Reference is also made to FIG. 4 which is a section taken on FIG. 3. The common rear wall on the common base mounts upper and lower multiple T-grooved brackets 45, for the sectionalized upper 46 and lower connection angle carriers 47, projectible into loading 48 or assembling-operating position 49 against the shape web 50, by previously described piston 25 and rotating mechanisms 19'. With the nuts placed in the multiple torquing recesses 51 of the upper carriers, the lower angle 52 with multiple attached rivet shanks 53 and the upper pre-drilled mating angle 54 are slid into the angle carriers and positioned by a small adjustable stop not shown. Alternately, the lower angle may be placed and raised against the web, upper angle placed on the web over the protruding shanks, nuts placed on shanks and the torquing mechanism 55, with light air pressure, lowered and slowly rotated until the torquing recesses grip all the nuts. Then the torquing continues until all the cltuches 56 or other adjustable throwout mechanisms signal all nuts are suitably torqued. The tandem stops 57, precisely spaced with respect to the operating centers of the drilling and bolting mechanisms, move as a unit and are adjustable by the common threaded shaft 58 hand-wheel 59. For beams of lesser depths, the drills and carriers on alternate sides are retracted out of action to keep the transverse operating centers of the bolting and torquing actions approximately centered on the boxes.

FIGS. 5 and 6 show, respectively, a front and end view of the lower connection angle 52 with threaded bolt shanks 53 securely fastened to the angle, preferably by stud welding. These would generally be high-strength bolts and nuts, with the connection angles being of metallurgical composition and welding characteristics to produce an assembly of the required strength.

The upper mating angle 54 is pre-drilled to match the bolt shanks in the lower angle 52.

The outstanding legs of both angles are pre-drilled for attachment to a supporting member.

Presented above is an improved, more facile and compact automatic apparatus and method of handling, measuring, laying-out, conveying, length-centering, and drilling srtructural shapes and of assembling and bolting pre-assembled mating connection angles to the web of the said shape.

What I claim as new and desire to protect by Letters Patent of the United States is:

1. An assembling apparatus for the handling and fabrication of structural beams comprising in combination the following means:
   a shape hoisting-transferring apparatus,
   improved co-operating dual combined drilling-assembly-nut torquing units, variably spaceable on a common track by a powered threaded shaft,
   dual shape-conveyor belts integral with said combined units,
   co-ordinated oppositely and equally projectible shape length-centering rams having length checking mechanisms integral with said combined units, means for utilizing,
   connection angles with plural integral threaded bolt shanks and pre-drilled mating connection angles and nuts, and
   fluid and electric power operating means for the improved drilling, assembling and bolting of structural members.

References Cited
UNITED STATES PATENTS

| | | | |
|---|---|---|---|
| 2,405,544 | 8/1946 | Anjesky | 29—430 |
| 3,052,140 | 9/1962 | Guyer | 29—200 |
| 3,113,373 | 12/1963 | Guyer | 29—155 |
| 3,119,173 | 1/1964 | Glaser | 29—200 |
| 3,399,445 | 9/1968 | Carroll | 29—200 |

THOMAS H. EAGER, Primary Examiner

U.S. Cl. X.R.

29—155, 430